UNITED STATES PATENT OFFICE.

CLARENCE G. SMITH, OF CLEVELAND, OHIO, ASSIGNOR TO HENRY J. HABER, OF PITTSBURGH, PENNSYLVANIA.

HEAT-PRODUCING COMPOUND.

1,019,377.  Specification of Letters Patent.  Patented Mar. 5, 1912.

No Drawing.   Application filed January 7, 1909.  Serial No. 471,099.

*To all whom it may concern:*

Be it known that I, CLARENCE G. SMITH, a citizen of the United States, resident of Cleveland, county of Cuyahoga, and State of Ohio, have invented a new and useful Improvement in Heat-Producing Compounds, of which the following is a specification, the principle of the invention being herein explained and the best mode in which I have contemplated applying that principle, so as to distinguish it from other inventions.

My invention relates to heat producing compounds whereby heat is produced by chemical action.

The object of the invention is to provide heat-producing means such as may be embodied in convenient form and economically and efficiently applied.

The said invention consists of a compound hereinafter fully described and particularly set forth in the claims.

My improved compound consists of a mixture of sodium hydrate, aluminum, and potassium nitrate. The above ingredients are preferably mixed in the proportion of ten (10) parts of the hydrate, four (4) parts of the nitrate, and three and one-half (3½) parts of metallic aluminum. The aluminum is preferably present in the form of a solid unitary mass.

To cause the above compound to produce heat, water is added thereto, a chemical action resulting from such addition which produces a degree of heat such as may be applied in various arts, such as fireless cooking, the evaporation of disinfectants, etc.

I have found that the above compound operates to successfully produce heat for certain purposes without the addition of the nitrate of potassium. I have found, however, that the addition of the nitrate permits of the combination of the nascent hydrogen evolved in the chemical action which follows the addition of water to the hydrate and aluminum, thereby permitting of the production of a greater number of heat units than would otherwise be obtained. By providing the aluminum in the form of a solid unitary mass, I find that the production of heat becomes sustained, the advantage of which is obvious to those skilled in the art. In some cases, however, I find that the action is more advantageously inaugurated and subsequently carried on by the addition of a small quantity of comminuted aluminum to the dry mixture.

It will be readily understood that inasmuch as sodium and potassium are chemically markedly analogous, the mixture above described may include sodium hydrate and sodium nitrate, potassium hydrate and sodium nitrate, or potassium hydrate and potassium nitrate.

What I claim therefore, and desire to secure by Letters Patent is:—

1. A heat-producing element comprising the combination of an alkali-metal hydrate, aluminum, and a substance which will combine with hydrogen.

2. A heat-producing element comprising the combination of an alkali-metal hydrate, aluminum and a substance which will combine with nascent hydrogen.

3. A heat-producing element comprising the combination of an alkali-metal hydrate, aluminum, and an alkali-metal nitrate.

4. A heat-producing element comprising the combination of an alkali-metal hydrate, aluminum in the form of a unitary mass and a substance which will combine with hydrogen.

5. A heat-producing element comprising the combination of an alkali-metal hydrate, aluminum in the form of a unitary mass and a substance which will combine with nascent hydrogen.

6. A heat-producing element comprising the combination of an alkali-metal hydrate, aluminum in the form of a unitary mass, and an alkali-metal nitrate.

7. A heat-producing element comprising the combination of an alkali-metal hydrate, comminuted aluminum, aluminum in the form of a unitary mass, and an alkali-metal nitrate.

Signed by me, this 28th day of December, 1908.

CLARENCE G. SMITH.

Attested by—
 A. E. MERKEL,
 WM. R. MILLER.